United States Patent [19]

Inculet

[11] Patent Number: 4,560,107
[45] Date of Patent: Dec. 24, 1985

[54] AERIAL SPRAYING APPARATUS

[75] Inventor: Ion Inculet, London, Canada

[73] Assignee: Ciba-Geigy AG, Basel, Switzerland

[21] Appl. No.: 503,557

[22] Filed: Jun. 13, 1983

Related U.S. Application Data

[63] Continuation-in-part of Ser. No. 398,004, Jul. 14, 1982, abandoned.

[51] Int. Cl.[4] ........................ B05B 5/02; B64D 1/18

[52] U.S. Cl. ........................ 239/3; 239/171; 239/69 D; 239/691; 244/136

[58] Field of Search .................. 239/3, 171, 690, 695, 239/704–708, 691; 244/1 A, 1 R, 136; 361/218, 225–228

[56] References Cited

U.S. PATENT DOCUMENTS

| | | | |
|---|---|---|---|
| 3,260,893 | 7/1966 | Cierva et al. | 361/218 |
| 3,297,281 | 1/1967 | Felici | 239/171 |
| 4,328,940 | 5/1982 | Malcolm | 239/171 X |

OTHER PUBLICATIONS

Report on "The Application of Electrostatically Charged Sprays from Aircraft", Southern Weed Science Society.

"Distribution of the Electric Field of An Electrostatic Spray Charging Aircraft", Carlton & Bouse.

"Electrostatic Spinner Nozzle for Charging Aerial Sprays", Carlton & Bouse.

"An Airfoil Sprayer", Cadavid and Roth Paper in ASEA Transactions-Carlton.

Leaflet showing one form of electrostatic spraying applied to aircraft.

Article "Jet Flaps", by Eclipse Systems Inc.

*Primary Examiner*—Andres Kashnikow

*Assistant Examiner*—James R. Moon, Jr.

*Attorney, Agent, or Firm*—Hirons, Rogers & Scott

[57] ABSTRACT

Aerial spraying apparatus includes two sets of nozzles located at spaced locations on an aircraft. Each nozzle has an electrode associated with it to induce a charge on the cloud of droplets issuing from the nozzle. A high potential is maintained on each electrode by a power pack that induces an equal and opposite potential on the electrodes of each set. By virtue of the opposed polarity of the electrodes, the aircraft is maintained at a neutral potential. To prevent a potential being imposed due to spray being deposited on the electrodes, a pair of corona needles are provided to establish a leakage current and maintain the electrodes at the required potential. This prevents the system becoming imbalanced and a potential being established on the aircraft.

22 Claims, 11 Drawing Figures

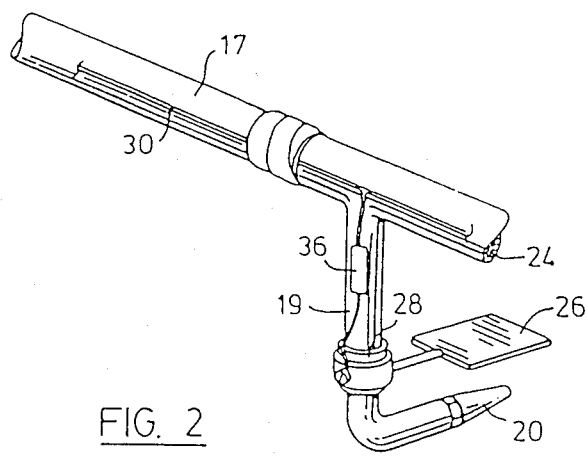
FIG. 2
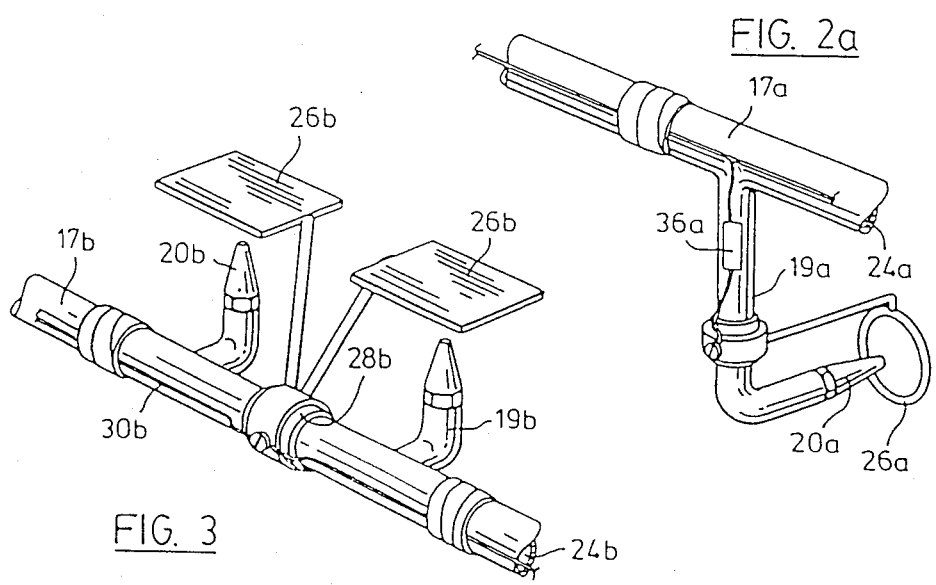
FIG. 2a
FIG. 3
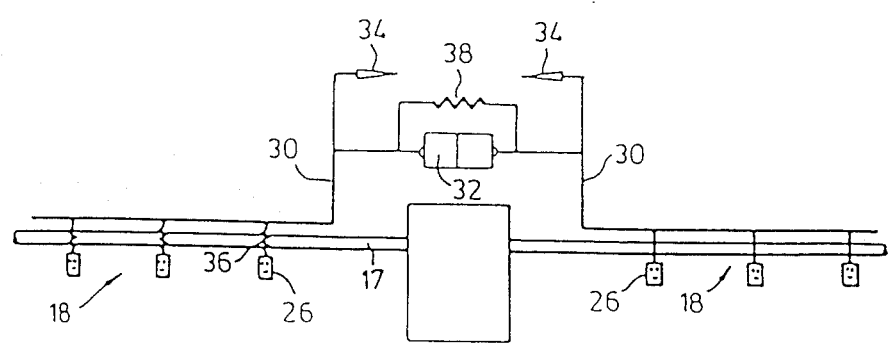
FIG. 4

AERIAL SPRAYING APPARATUS

RELATED APPLICATION

This is a continuation-in-part of U.S. Pat. application Ser. No. 398,004, filed on July 14, 1982, and entitled "Aerial Spraying Apparatus", now abandoned.

The present invention relates to spraying apparatus and the method of using such apparatus.

The use of sprays to apply pesticides, herbicides or other form of crop treatment to crops has become widespread in the agricultural, horticultural and forestry industries. The sprays are usually formed from a liquid source which is pumped through a nozzle to provide a diverse cloud of droplets. This spraying can be performed either by aerial spraying from an aircraft or from the ground on a tractor borne spraying apparatus. The use of aerial spraying is obviously desirable where large areas are to be covered in a minimum of time but ground spraying is preferred where accurate placement of the spray is required.

To assist in the deposition of the droplets of crop treating fluid on to the crop, ground spraying machines have been developed in which an electrostatic charge is applied to the droplet as they issue from the nozzle. This electrostatic charge causes the droplets to be attracted to the crop and thereby increases the deposition and reduces the drift of the crop treating fluid. Whilst the electrostatic spraying apparatus presents a major advance in the control of the spraying fluid it has not yet been possible to apply this technology to aerial spraying. The use of conventional charging apparatus on an aircraft results in the fuselage of the aircraft acquiring a very high potential during the spraying operation which presents a hazard upon the aircraft returning to ground. This potential also inhibits spraying as the fuselage generates ions that neutralise the charge on the droplets. These problems are summarised in a paper's abstract published in the proceeding of the Southern Weed Science Society 129th Annual Meeting in 1976 entitled "Report On The Application Of Electrostatically Charged Sprays From Aircraft".

The effects of aerial spraying have been investigated and reported in a number of articles without providing a solution to the above problems. In a paper entitled "Distribution Of The Electric Field Of An Electrostatic Spray Charging Aircraft" (Transactions of the ASAE (VOl. 20) No. 2 pp. 248-257, 1977) Messrs. Carlton and Bouse reported on tests conducted on an aircraft using unipolar electrostatic charges. As a result of these tests it was found that the aircraft fuselage developed a corona discharge and accordingly the disadvantages discussed above would be present.

The benefit of generating electrostatically charged droplets from a spray arrangement conventionally used in aircraft environments was shown in a paper entitled "Electrostatic Spinner Nozzle For Charging Aerial Sprays" published by Carlton and Bouse in the Transactions of the ASAE (Vo.23 No. 6 pp. 1369-1378, 1980). Whilst these tests showed the benefit of such a system, the problems of utilising it in an aerial environment were not solved as all the tests were conducted at ground level.

Similarly, results of tests to determine the electrical capacitance of an aircraft as reported by Carlton in ASAE Transactions (Vo. 18, No. 4 pp. 641-644; 1975) offer no solution to these problems, and merely verify that the aircraft does acquire a potential when a unipolar charged spray is released.

An attempt to use an electrostatically charged tube in a sprayer environment is reported in the 1974 Transactions of the ASAE in an article entitled "An Airfoil Sprayer" by Cadavid and Roth. However all the tests reported were conducted in a ground environment and again do not offer any solution to the fuselage charging phenomena discussed above.

One form of electrostatic spraying applied to aircraft is that manufactured by Eclipse Systems Inc. of Franklin, New Jersey. This system requires the addition of an electrode in the tail of the aircraft to neutralise the fuselage. However, this system is relatively expensive to install and also reduces the efficiency of the charging system.

Attempts to obtain the benefits of electostatic spraying without the attendant problems discussed above have proposed the use of special aerofoil sections to achieve a downwash of air to carry the insecticides into the crop. This approach was adopted specifically to overcome the fuselage charging problem discussed above but has not been commercially successful due to the major modifications required to the aircraft.

Accordingly therefore whilst the benefits of electrostatic spraying have been recognised, the problems associated with such spraying have prevented its application to aerial spraying.

It is therefore an object of the present invention to provide a method and apparatus of aerial spraying in which the above disadvantages are obviated or mitigated.

According therefore to the present invention there is provided a method of spraying comprising the steps of generating predetermined charges of opposite polarity at a pair of electrodes mounted on a vehicle, issuing a stream of droplets from at least one nozzle and causing said stream to pass said electrodes to generate a pair of clouds of droplets charged with opposite polarity.

According also to the present invention there is provided spraying apparatus for mounting on a vehicle to spray an atomised liquid, said apparatus comprising a pair of electrodes for mounting on said vehicle, electrostatic charge generating means to supply charges of opposite polarity to respective areas of said electrodes so that said electrodes have equal and opposite charges and spray generating means to produce a cloud of droplets in the vicinity of each electrode whereby a pair of oppositely charged clouds of droplets is generated whilst maintaining said vehicle at a neutral polarity.

Embodiments of the invention will now be described by way of example only with reference to the accompanying drawings in which;

FIG. 2 is an enlarged view of the portion of the apparatus shown in FIG. 1 encircled and identified by arrow 2.

FIG. 2a is a view similar to FIG. 2 showing an alternative embodiment of electrode.

FIG. 3 is a view similar to FIG. 2 showing an alternate embodiment of the spray apparatus.

FIG. 4 is a schematic illustration of the spraying apparatus shown in FIG. 1 to illustrate its principle of operation.

Figure 1:
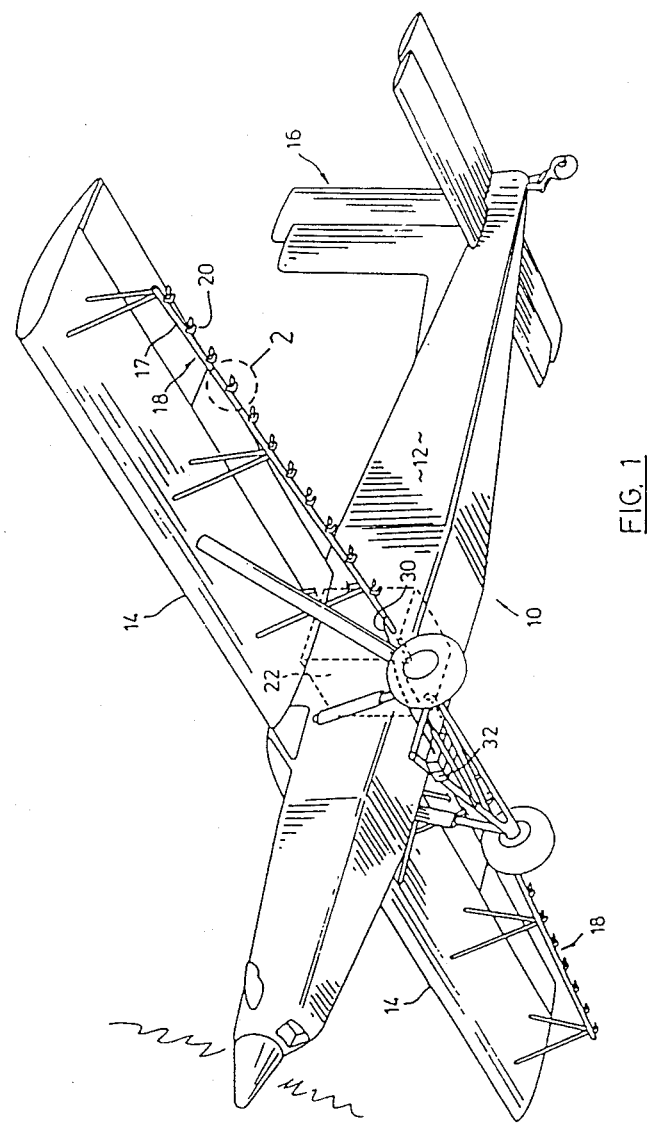
FIG. 1 is a schematic diagram of an aircraft having spraying apparatus mounted thereon.

Referring now to FIGS. 1 and 2, an aircraft generally designated 10 includes a fuselage 12, a pair of wing assemblies 14 and a tail plane 16. Spraying apparatus is mounted on the underside of the wing assemblies 14 and is divided into two spray units 18. As the spray unit 18 located on each wing is similar, only one has been described in detail.

The spray unit 18 comprises a hollow boom 17 having a plurality of L shaped arms 19 depending from the boom 17. The arms 17 are also hollow and receive at their distal end a nozzle 20. The interior of the boom 17 and arm 19 define a conduit 24 to convey fluid from a reservoir 22 located in the fuselage to the nozzle 20.

The nozzle 20 is of conventional form such as that sold by Spraying Systems Co., Wheatin, Ill. under the trade mark Tee Jet and fluid is pumped from the reservoir 22 in any conventional manner to provide a cloud of droplets from the nozzle 20.

Mounted on the boom 17 adjacent the exit of each of the nozzles 20 is an electrode 26. The electrode 26 is placed so that fluid issuing from the nozzle 20 has a charge induced on it as it issues from the nozzle and is dispersed as droplets. The electrode 26 is supported on the arm 19 and is electrically isolated from it by an insulating barrier 28. Each electrode on the boom 17 is connected by an insulated cable 30 to one terminal of a high voltage power pack 32 located on the undercarriage of the aircraft 10. The opposite terminal of the power pack 32 supplies a charge of opposite polarity to the electrodes 26 carried by the boom 17 under the opposite wing of the aircraft 10. The power pack 32 therefore provides a positive potential to the electrodes 26 of one of the spray units 18 for example the starboard unit and provides a negative potential to the electrodes 26 of the other i.e. the portside of the spray units 18. The potential applied is typically in the order of 12 kv and this potential may be provided by any suitable form of power pack which is well known for supplying charges of this nature. The potential applied may typically lie in the range 2 kv to 20 kv but could extend beyond this range depending on the nature of the fluid sprayed and the conditions under which spraying occurs.

As may be seen in FIG. 4, each of the cables 30 is supplied with a corona discharge needle, 34. The needles 34 are directed toward each other and are located in close proximity to each other. The needles 34 comprises a length of exposed metal that terminates in a sharp point to promote corona discharge at a minimum potential.

Connected between each electrode 26 and the cable 30 is a resistor 36 having a nominal value in the order of $500 \times 10^6$ ohms. to prevent a large current flow in the conductor 30 should one of the electrodes become accidentally grounded.

As a further safety factor a bleed resistor 38 is connected between the terminals of the power pack 32 to provide equalisation of the charges on the electrodes 26 when operation of the power pack is terminated.

In operation the fluid to be sprayed is supplied through respective conduits 24 to each of the nozzles 20 where it is emitted as a cloud of droplets. The electrodes 26 are supplied with equal and opposite potential by means of the power packs 32 and induce a charge of opposite polarity on the fluid issuing from the nozzle 20. As the fluid is dispersed in a cloud of droplets the charge is retained on the individual droplets as they pass from the influence of the electrodes 26. Thus, the cloud issuing from nozzle adjacent the positive electrode will acquire a negative charge whereas the droplets issuing from the negatively charged electrode will acquire a positive charge relative to the crop on which they are to be deposited. The droplets are therefore attracted to the crop in the same manner as occurs with ground mounted spraying apparatus.

However, because the electrodes 26 the port and starboard units 18 are charged to equal and opposite potential, the fuselage 12 and wing assembly 14 remains at a neutral potential during the spraying operation. Accordingly it is possible to spray electrostatically charged droplets from an aircraft without inducing extremely high and dangerous potentials on the fuselage of the aircraft. Moreover, the electrically floating charging system is self balancing in that any mismatch of electron flow from one of the electrodes will result in the fluid reservoir acquiring a charge of opposite polarity to the one electrode. This charge is superimposed on the system so that the effect is to reduce the charge flow from the one electrode and increase it from the other. The system therefore maintains itself at neutral polarity.

Whilst the system will be self balancing for mismatched flows, it is possible that net charge will be acquired by the system due to spray being deposited on the electrodes 26 from the nozzles 20. The corona needles 34 mitigate this effect by providing a charge leakage path from each of the two cables 30. The effectiveness of this arrangement is shown in table I below.

| | WATER JETS "OFF" Floating system, single 6 kV supply used | | | | WATER JETS "ON" Floating system, single 6 kV supply used | | | |
|---|---|---|---|---|---|---|---|---|
| | Without corona needles | | With corona needles | | Without corona needles | | With corona needles | |
| Potential kV | Initial condition t = 0 | At steady state | Initial condition t = 0 | Steady state after 90 s | Initial condition t = 0 | At steady state | Initial condition t = 0 | Steady state after <1 s |
| IE(+) | +6.0 | +6.0 | +5.8 | +2.45 | 0 | 0 | 0 | +3.3 |
| IE(−) | 0 | 0 | 0 | −3.3 | −6.0 | −6.0 | −6.0 | −2.7 |
| Water Tank | — | — | — | — | −2.0 | −2.0 | −3.25 | 0 |

The table above shows the results of tests conducted on an experimental system in which a pair of electrodes were charged and one subsequently grounded to provide a potential difference between the two electrodes. A first set of tests were conducted without fluid flowing through the system and it will be seen that without the corona needles 34 present the potential between the electrodes was maintained. However, with the corona needles 34 present the potential on the two electrodes were substantially equal after 90 seconds and reduced to the corona threshold potential of the needles.

The tests were then repeated with fluid being discharged from the nozzle and again it wil be seen that no equalisation was obtained without the corona needles. Moreover, the reservoir (and therefore in a practical installation, the fuselage) acquired a significant potential. However with the corona needles the charges were equalised after less than 1 second and the induced potential reduced to zero.

Accordingly it will be seen that even under extreme adverse conditions the fuselage of the aircraft can be maintained at a neutral potential.

The location and configuration of the electrode 26 will depend on the type of nozzle 20 and its orientation on the aircraft. Thus in the embodiment shown in FIG. 2 the nozzle 20 is equipped with a spray tip designed to produce a flat planar spray pattern. With this configuration a plate electrode 26 is used which is positioned to overlap a portion of the nozzle 20 and to extend partially downstream. Thus the electrode induces a charge on the fluid supplied to the spray tip and maintains that charge as the fluid is dispersed in droplets.

In the embodiment shown in FIG. 2a, in which the components are designated with like reference numerals with a suffix "a" added for clarity, the nozzle tip is chosen to produce a hollow conical spray pattern. With such a pattern excessive splashing of a plate electrode may occur during operation so an electrode 26 is chosen with a toroidal shape centered on the longitudinal axis of the nozzle to encompass the tip of the nozzle 20a. With such an electrode the cloud of particles passes through the centre of the electrode as it is dispersed from the nozzle and thereby retain the charge induced on them.

The embodiment of FIG. 3 shows an arrangement in which the nozzles 20b deliver fluid perpendicular to the air stream as is conventionally used on some types of spray equipment and to avoid the support bracket of the plate electrode interfering with the air flow, the electrodes are mounted in pairs on a common bracket intermediate the two nozzles 20c. Again a plate like electrode 26b is used to induce the charge in the fluid delivered to the nozzle tip and maintain the charge as the droplets are dispersed.

The nozzles could be made of any suitable material, typically brass or stainless steel, but may also be made from a non-conducting material, such as plastics, to achieve an increased concentration of charge on the fluid.

Figure 5:
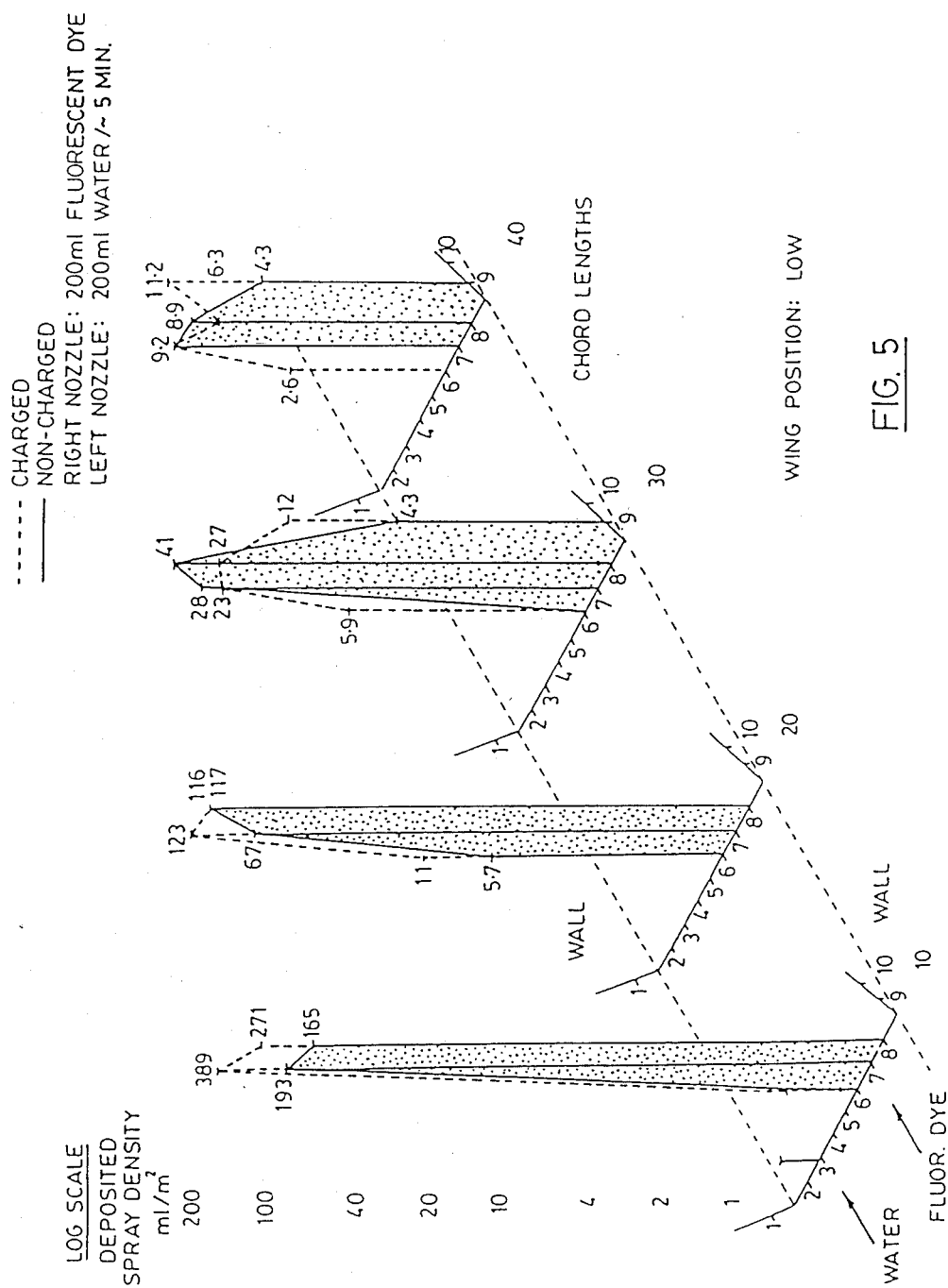
FIGS. 5, 6 and 7 are graphical representations of results obtained in tests showing the increased deposition obtained by employing electrostatic charging of the spray.
Figure 6:
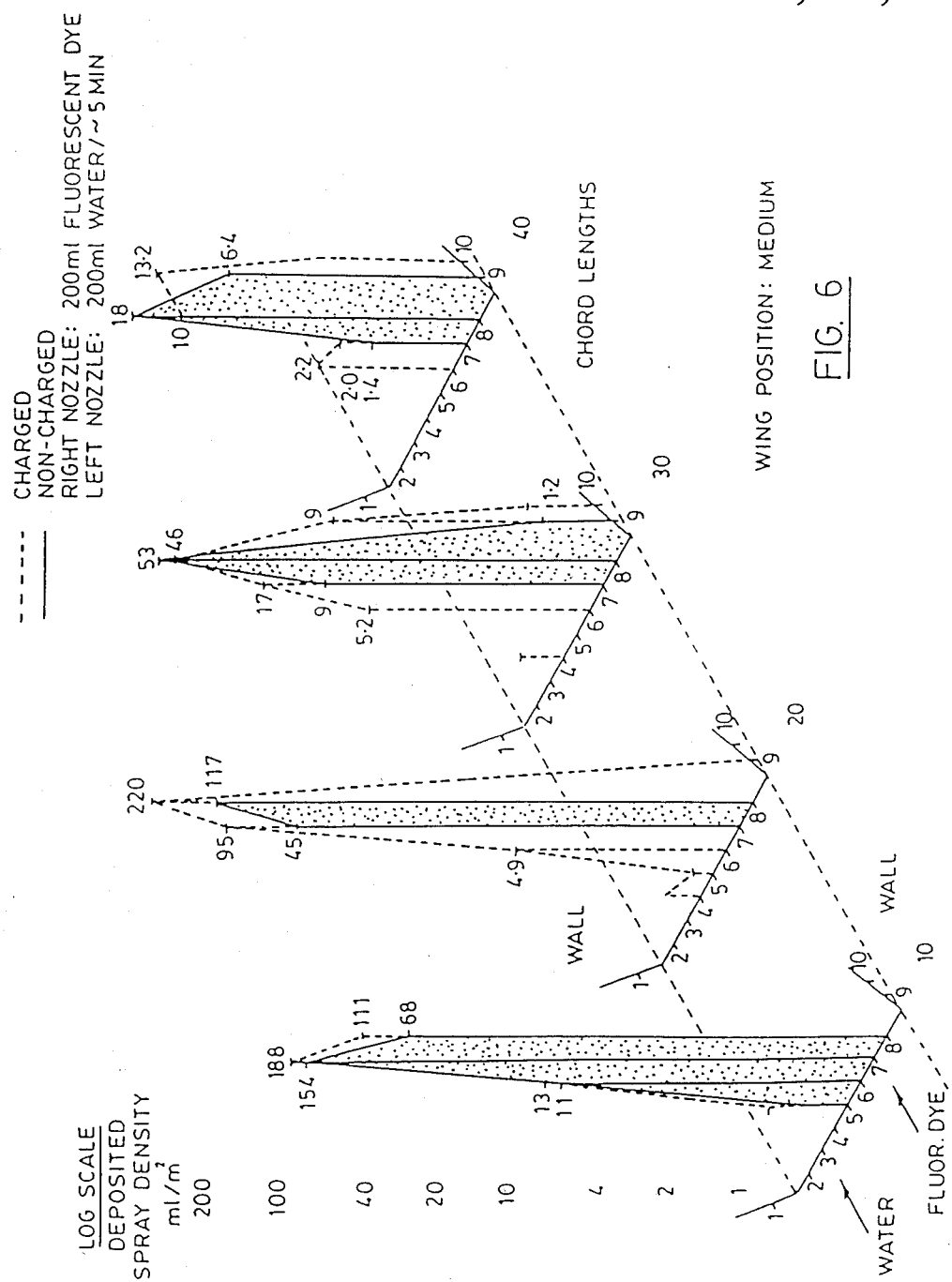
Figure 7:
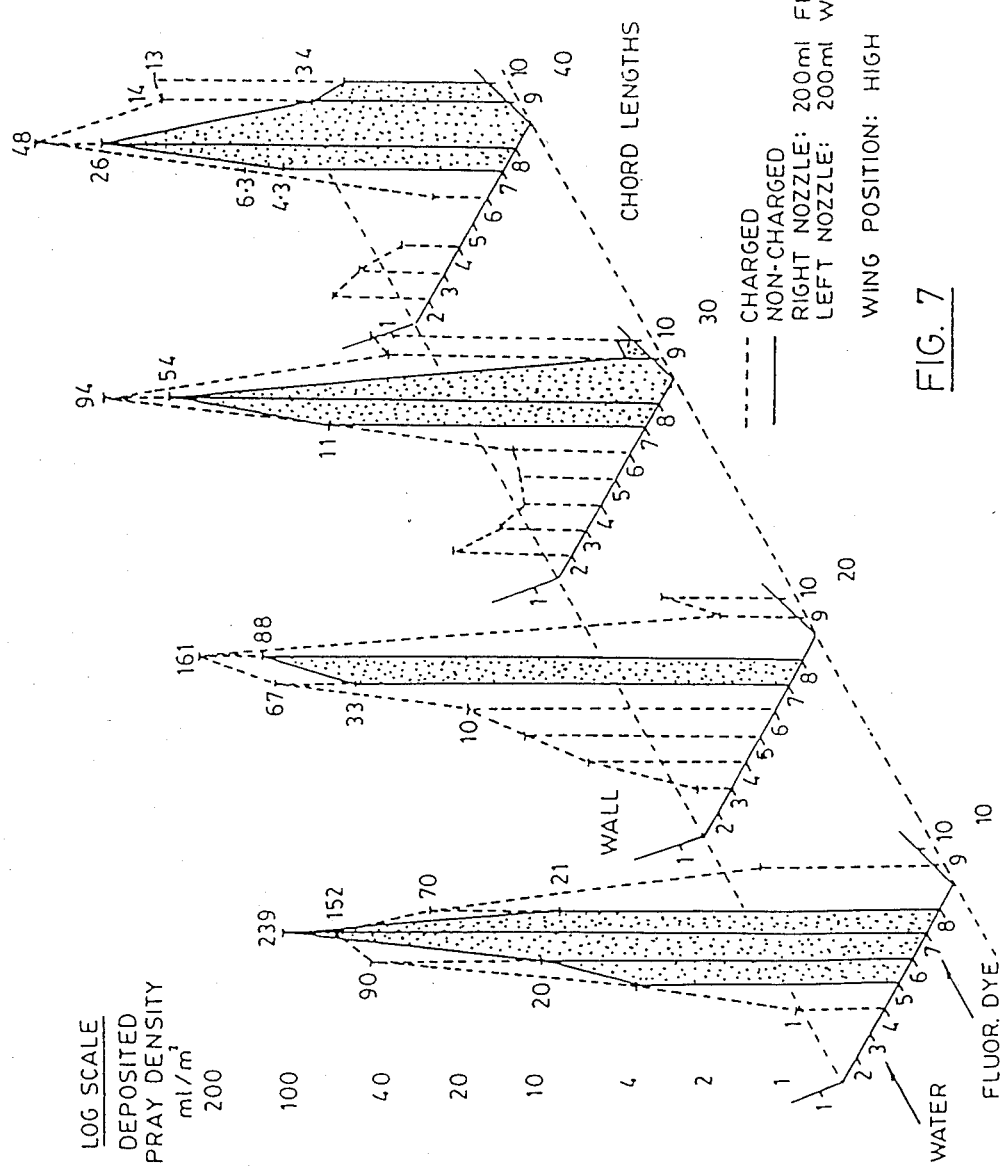

Experiments were conducted in a wind tunnel with a model wing and nozzle installation to verify the efficacy of the system. The results obtained are shown in FIGS. 5, 6, 7 with each figure representing a different position of the wing in the wind tunnel. Each test was conducted with charged and uncharged sprays and with one set of nozzles spraying water and the other set spraying a fluorescent dye. Rows of plates were located at different positions along the tunnel and the dye collected on each plate used as a measure of the deposition rate.

In each test it will be observed that improved deposition occured with the charged spray. It will be noted from FIG. 7 that not only did increased deposition occur but improved lateral distribution occurred, particularly close to the wing. It will be appreciated that the abscissa of FIG. 5 through 7 are on a logarithmic scale and therefore the increased deposition indicated does in fact represent approximate doubling of the deposition rate.

Figure 8:
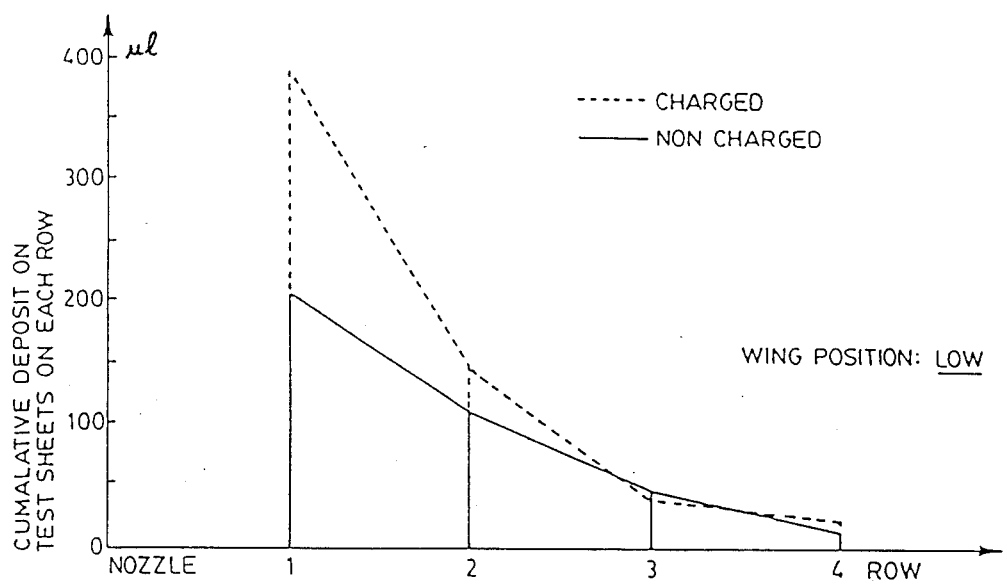
FIGS. 8, 9 and 10 are further graphical representations showing the results of the tests to compare conventional and electrostatic spraying systems.
Figure 9:
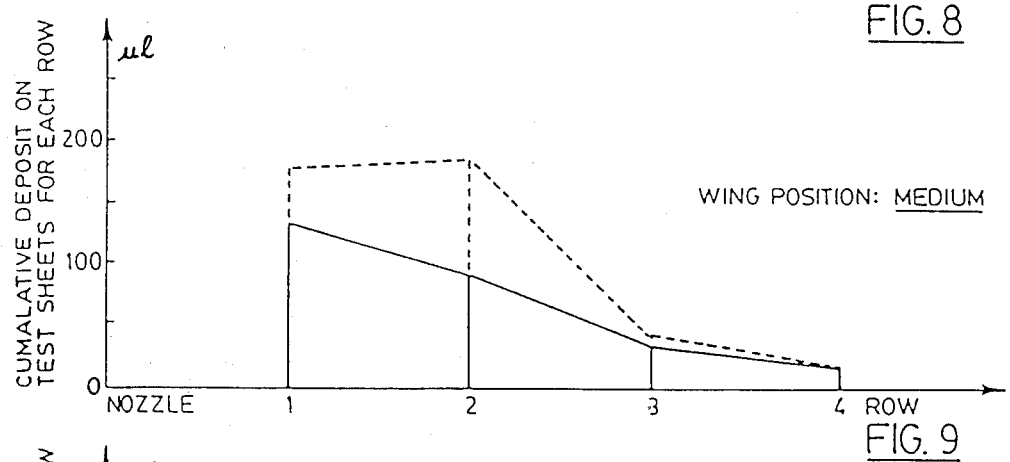
Figure 10:
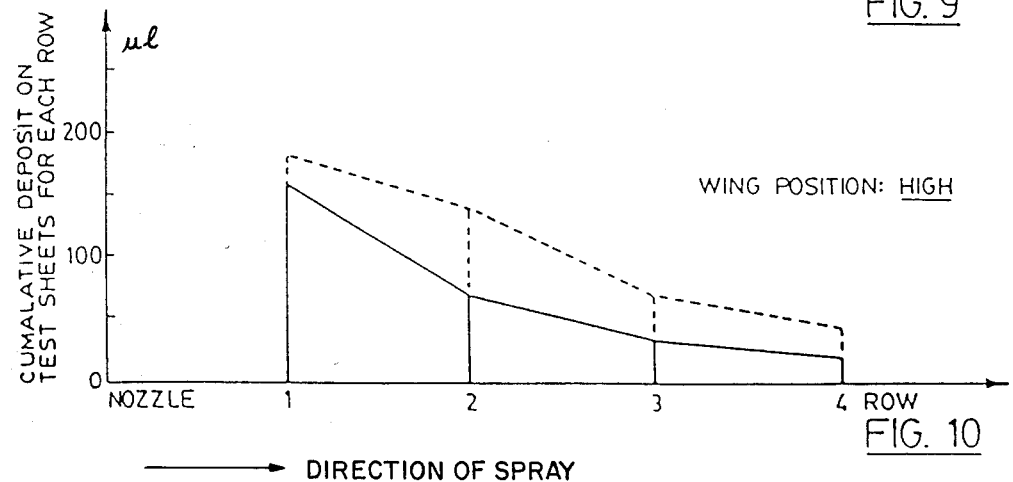

The results shown in FIGS. 5 through 7 are reflected in FIGS. 8 to 10 where the cumulative spray at different points along the length of the tunnel is shown. Again it will be observed that in all cases the cumulative deposition is increased with the charged spray and that a noticeable improvement is achieved adjacent the wing thereby implying improved accuracy of spraying.

It will be seen therefore from the above tests that improved deposition does occur with electrostatic charging of the sprayed fluid and that by supplying oppositely charged clouds the fuselage of the aircraft may be maintained at a neutral potential.

Whilst the invention has been described with reference to and has particular utility on an airborne vehicle it will be appreciated that the system is equally applicable to a land or water borne vehicle where an adequate ground connection may be difficult to achieve. Where the system is intended for use in an airborne vehicle a number of additional safety features may be incorporated such as the use of a touch down grounding strip on the aircraft and an aircraft potential monitoring system. Similarly with such systems it is preferable to utilise an equipotential bonding system on the aircraft to ensure equal potential through the aircraft. The power source should also be a dry battery and remote switching by infrared photocell or similar could be used to reduce the capacitance of the system.

The embodiments of the invention in which an exclusive property or privilege is claimed are defined as follows:

1. A method of spraying a material from a vehicle comprising the steps of generating predetermined charges of opposite polarity at a pair of electrodes mounted at laterally spaced locations on said vehicle, issuing a pair of streams of droplets of said material from nozzle means and causing a first of said streams to pass one of said electrodes and a second of said streams to pass the other of said electrodes to generate a pair of laterally spaced clouds of droplets of said material charged with opposite polarity whilst maintaining said vehicle at a neutral potential.

2. A method according to claim 1 wherein charges on said droplets are induced by said electrodes.

3. A method according to claim 2 including the step of establishing a corona discharge path from each electrode to dissipate charge in excess of said predetermined charge accumulated on said electrode.

4. A method of spraying a fluid from an airborne vehicle having two laterally spaced sets of spray nozzles to discharge said fluid and an electrode associated with each nozzle of each set to maintain said vehicle at neutral potential, said method comprising the steps of generating a charge of predetermined magnitude and opposite polarity on the electrodes of respective sets and inducing in fluid issuing from said nozzle a charge of opposite polarity prior to dispersion of said fluid into a cloud thereby generating a pair of laterally spaced oppositely charged clouds of droplets.

5. The method according to claim 4 including the step of maintaining the charge on said electrodes at said predetermined magnitude by establishing a corona discharge path from the electrodes of each set of nozzles.

6. Spraying apparatus for mounting on a vehicle to spray an atomised liquid, said apparatus comprising a pair of electrodes for mounting on said vehicle, electrostatic charge generating means to supply charges of opposite polarity to respective areas of said electrodes so that said electrodes have opposite charges and spray generating means to cause a cloud of droplets of said liquid to pass over each electrode and produce a pair of laterally spaced oppositely charged clouds of droplets whilst maintaining said vehicle at a neutral polarity.

7. Apparatus according to claim 6 wherein said spray generating means comprises at least one nozzle located adjacent each of said electrodes.

8. Apparatus according to claim 7 wherein said electrodes are located at laterally spaced locations on said vehicle.

9. Aerial spraying apparatus for mounting on an airborne vehicle to spray a fluid, the apparatus comprising two sets of nozzles to be located at laterally spaced locations on said vehicle, each of the nozzles of each set having an electrode associated therewith, charge generating means to supply a charge to each of said electrodes, said charge generating means supplying a charge of opposite polarity to the electrodes of each of said sets, and fluid supply means to supply fluid to each of said nozzles to generate a fluid spray therefrom, said electrodes generating opposite charges fluid clouds issuing from each set of nozzles to maintain said vehicle of neutral potential.

10. Aerial spraying apparatus according to claim 9 including a corona discharge needle associated with the electrodes of each set to provide a current leakage path for said electrodes.

11. Aerial spraying apparatus according to claim 10 wherein said discharge needles are directed toward one another.

12. Aerial spraying apparatus according to claim 11 including a bleed resistor connected across said charge generating means to neutralise charges on said electrodes upon termination of charge generation.

13. Aerial spraying apparatus according to claim 12 wherein each of said electrodes is connected to said charge generating means through a resistor to inhibit current flow from said charge generating means and adjacent electrodes upon grounding of one electrode.

14. Aerial spraying apparatus according to claim 9 wherein each of said electrodes is positioned to induce an electrostatic charge on said fluid as it is dispersed from said nozzle.

15. Aerial spraying apparatus according to claim 14 wherein said electrode is a plate lying in a plane substantially parallel to the longitudinal axis of its respective nozzle and overlying a portion of the nozzle.

16. Aerial spraying apparatus according to claim 14 wherein said electrode is a torous having a centre coincident with the longitudinal axis of its respective nozzle and positioned adjacent the tip thereof.

17. Aerial spraying apparatus according to claim 14 wherein said electrode is a plate disposed in a plane perpendicular to the longitudinal axis of its respective nozzle and spaced along said axis from the tip thereof.

18. Aerial spraying apparatus for attachment to an airborne vehicle to spray a fluid, said apparatus comprising a pair of booms each of which carries a plurality of nozzles for connection to a fluid reservoir, and is adapted to be attached to said vehicle at laterally spaced locations, each of said nozzles having a respective electrode associated therewith and positioned relative thereto to induce a charge upon fluid dispersed from said nozzle, charge generating means to generate charge of opposite polarity at respective outputs, first conduction means to connect one of said outputs with the electrodes of one of said booms and second conduction means to connect the other of said outlets to the other of said booms, said electrodes thereby inducing charges of opposite polarity in laterally spaced clouds of fluid dispersed from the nozzles carried by respective booms to maintain a neutral potential on said airborne vehicle.

19. Aerial spraying apparatus according to claim 18 wherein each of said nozzles is supported on arms depending from said boom.

20. Aerial spraying apparatus according to claim 19 wherein each of said electrodes is supported on said arms.

21. Aerial spraying apparatus according to claim 18 wherein each of said electrodes is supported on and electrically isolated from said boom.

22. Aerial spraying apparatus according to claim 21 wherein said conduction means are connected to each of said electrodes through a resistor to inhibit current flow from one electrode to an adjacent electrode.

* * * * *